W. L. HARRIS.
PEANUT PLANTER.
APPLICATION FILED SEPT. 1, 1911.
1,041,275.
Patented Oct. 15, 1912.
2 SHEETS—SHEET 1.
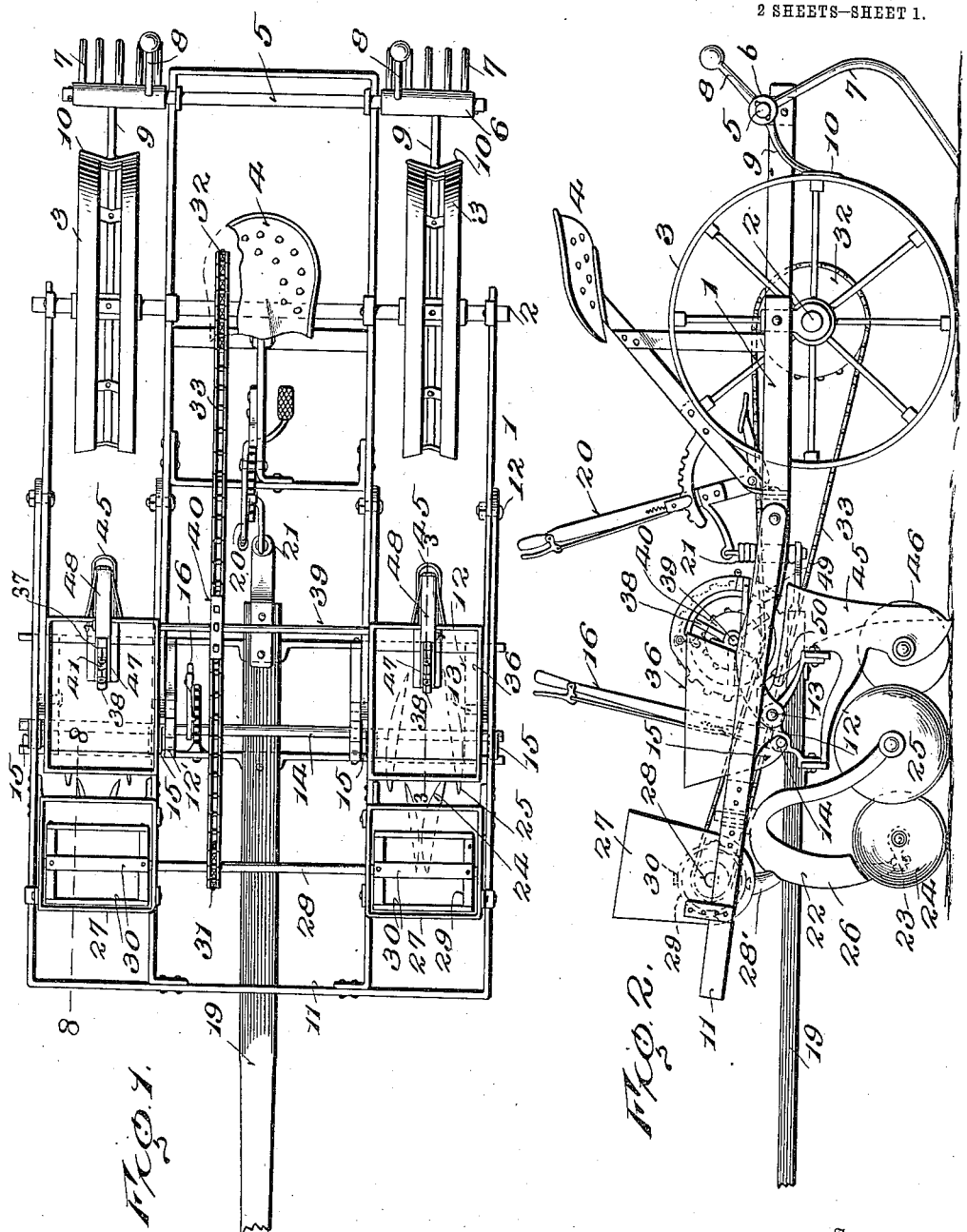
Witnesses
Cora M. Handy.
Joana M. Fallin.
Inventor
W. L. Harris
By
A. M. Avery, Attorneys.

W. L. HARRIS.
PEANUT PLANTER.
APPLICATION FILED SEPT. 1, 1911.
1,041,275.
Patented Oct. 15, 1912.
2 SHEETS—SHEET 2.
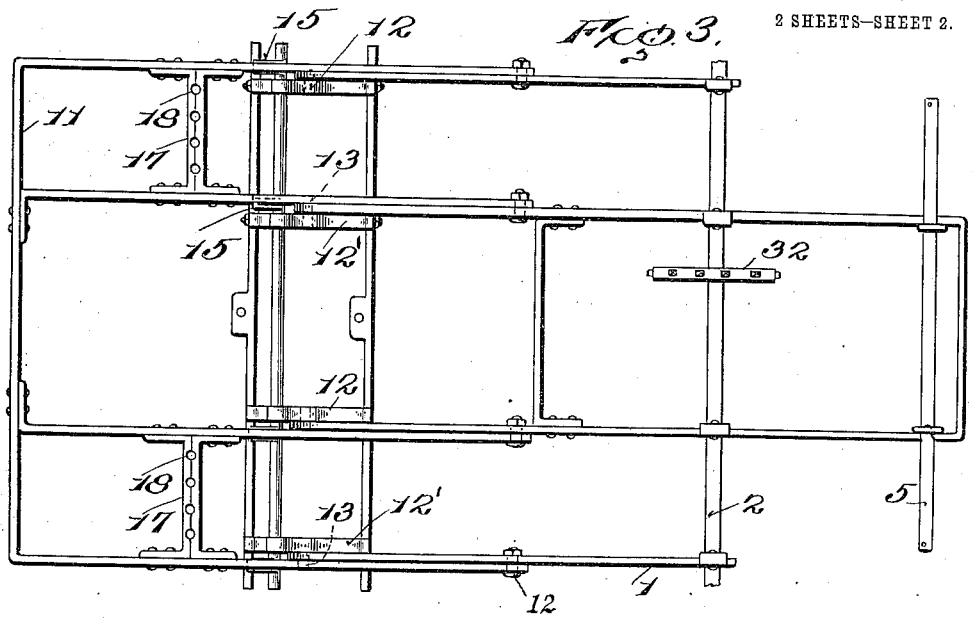
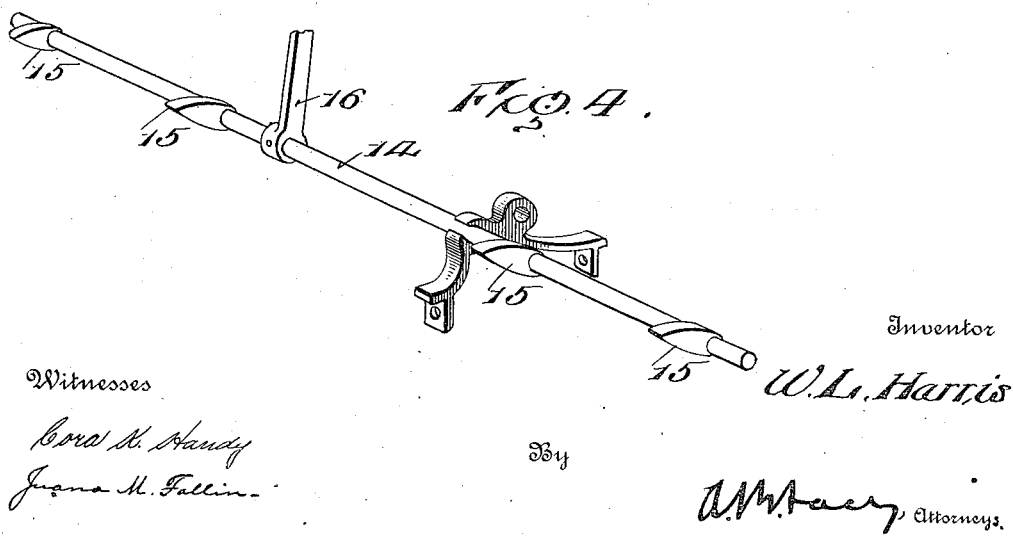

UNITED STATES PATENT OFFICE.

WILLIAM L. HARRIS, OF PETERSBURG, VIRGINIA.

PEANUT-PLANTER.

1,041,275.  Specification of Letters Patent.  Patented Oct. 15, 1912.

Application filed September 1, 1911. Serial No. 647,270.

*To all whom it may concern:*

Be it known that I, WILLIAM L. HARRIS, a citizen of the United States, residing at Petersburg, in the county of Dinwiddie and State of Virginia, have invented certain new and useful Improvements in Peanut-Planters, of which the following is a specification.

This invention relates to peanut planters, and has for its object to provide a machine of this character the parts of which may be adjusted so that two rows may be planted simultaneously at variable distances apart.

A further object of the invention is to provide in combination with a planter, means for opening a furrow, means for depositing fertilizer in the same, and means for covering the fertilizer, completely filling the furrow and raising a slight ridge. In combination with these means, means for delivering the seed into the furrow is provided. The planter is provided with furrow closers of usual form and is also provided with means for leveling the soil after the furrow has been closed.

For a full understanding of the invention, reference is to be had to the following description and accompanying drawings, in which:

Figure 1 is a top plan view of the planter; Fig. 2 is a side elevation of the same; Fig. 3 is a plan view of the frame of the planter; Fig. 4 is a perspective view of a shaft used upon the planter for raising and lowering a portion of the frame of the planter.

Corresponding and like parts are referred to in the following description and indicated in all the views of the accompanying drawings by the same reference characters.

The frame of the planter consists of a rear portion 1 which carries an axle 2 upon which is mounted wheels 3. These wheels may be shifted longitudinally of the axle and retained in desired positions thereon in a manner usual in planters. An operator's seat 4 is mounted upon the portion 1 of the planter frame.

A shaft 5 is mounted upon the rear part of the portion 1 and sleeves 6 are journaled at the end portions of the said shaft. Each of the sleeves 6 carries a set of tines 7 and a handle 8. An operator may grasp the handles 8 and turn the sleeves 6, whereby the tines may be elevated above the surface of the soil or positioned so that they will engage the soil. Arms 9 are carried by the sleeves 6 and in turn carry scrapers 10 which operate upon the rear portions of the wheels 3 and prevent the soil from accumulating thereon.

A frame portion 11 is pivoted to the portion 1 at the points 12 and is adapted to swing vertically with relation to the portion 1. Brackets 12' are mounted upon the portion 1 and carry pins 13 which lie under the intermediate parts of the portion 11 and serve as means for limiting the downward swinging movement of the forward part of the portion 11. The said pins also serve as means for pivotally connecting the brackets 12' to the frame portion 1. A shaft 14 is journaled in the brackets 12' and is provided with cams 15 which lie under the intermediate parts of the portion 11. A lever 16 is fixed to the shaft 14 and is adapted to be swung whereby the shaft is partially rotated and through the cams 15 the forward part of the portion 11 may be swung in an upward direction. Thus means is provided for elevating the forward part of the portion 11 with relation to the frame portion 1. Cross bars 17 are carried at the side parts of the portion 11 and are each provided with a series of openings 18. A tongue 19 is connected at its rear end with a lever 20 fulcrumed upon the frame portion 1 by means of a spring 21. The tongue 19 is attached directly to the cross bars which connect the brackets 12' together. These brackets are pivotally connected with the frame 1 by the pins 13 hereinbefore described. The tongue 19 is attached directly to the cross bars which connect the brackets 12' together. These brackets are pivotally connected with the frame 1 by the pins 13 hereinbefore described. The tongue 19 is adapted to be supported at its forward end upon the neck yoke of draft animals and consequently when the lever 20 is swung so that the rear end of the tongue 19 is elevated the forward part of the frame portion 1 is raised, and when the lever 20 is swung so that the rear end of the tongue 19 is moved in a downward direction the forward part of the frame portion 1 is lowered.

Caster frames 22 are pivoted at their upper ends in the openings 18 and may be adjusted along the bars 17. Brackets 23 are pivoted to the forward portions of the frames 22 and carry journaled disks 24. These disks are located at the opposite sides of the forward portions of the frames 22 and have their forward edges in close proximity and diverge from each other toward their rear edges. Disks 25 are journaled at the rear portions of the frames 22 and their forward edge portions are located beyond the outer sides of the rear portions of the disks 24. The rear portions of the disk 25 converge toward each other. The forward parts 26 of the caster frames 22 are hollow and open at their lower ends between the disks 24. Hoppers 27 are mounted upon the frame portions 11 and are provided at their bottoms with openings and are connected by means of flexible tubes 28′ with the hollow portions 26 of the frames 22. A shaft 28 is journaled in the hoppers 27 at the opposite sides of the frame portion 11 and within the said hoppers the said shaft 28 carries spiders 29. The spiders 29 in each hopper are connected together by bars 30 which serve as stirrers and ejectors for fertilizer which the said hoppers are adapted to contain.

A sprocket wheel 31 is fixed to the shaft 28 and a sprocket wheel 32 is fixed to the axle 2. A sprocket chain 33 is trained around the sprocket wheels 31 and 32 and is adapted to transmit rotary movement from the axle 2 to the shaft 28. Boxes 36 are fixed upon the frame portion 1 and are provided in their bottoms and rear sides with slots 37. A wheel 38 is journaled for rotation at the rear side of each box 36 and the forward portion of each wheel 38 projects through the slot 37 in that box upon which the wheel is mounted. The wheels 38 are fixed upon a shaft 39 and a sprocket wheel 40 is fixed to the said shaft and engages the upper side of the upper run of the chain 33. Each wheel 38 is provided at its periphery with a series of recessed lugs.

Boots 45 are carried by the frame portion 1 and the wheels 38 are located directly above the upper ends of these boots. Disks 46 are journaled at the lower end portions of the boots 45 and the forward parts of the disks 46 are between the rear parts of the disks 25 located at the same side of the machine.

Shields 47 are located at the opposite sides of each wheel 38 and normally lie in the hoppers 36 at the side edges of the slots 37 therein. These shields are adapted to prevent the nuts or seed from coming in contact with the spokes of the wheels 38. At their upper portions the shields 47 are connected with a hood section 48 which extends around the upper rear portion of each wheel 38 and which is hingedly connected at its lower rear end with a hood section 49 which is in turn rigidly supported from the hopper 36. The discharge end of the hood section 48 is located above the receiving end of the boot 45.

The operation of the planter is as follows: As the machine is drawn along the ground the disks 24 open furrows therein and at the same time fertilizer drops from the hoppers 27 through the tubes 28′ and parts 26 of the frames 22 between the disks 24 at the opposite sides of the machine and into the furrows opened thereby. The disks 25 following immediately behind the disks 24 cover the fertilizer in the furrows and put up a slight ridge. By reason of the fact that the brackets 23 which carry the disks 24 are pivotally mounted at the forward portions of the frames 22 the said disks 24 may have slight lateral swinging movement to avoid minor obstructions, and by reason of the fact that the caster frames 22 are pivoted in the bars 17 the said frames may swing when any of the disks carried thereby come in contact with major obstructions without damage. The disks 46 make incisions in the soil which has been cast upon the fertilizer deposited in the furrow and they also prevent a tendency to side draft. The seed passes down through the boots 45 along the disks 46 and fall behind the said disks into the incisions made by them. The seed thus deposited in the ground is covered by the soil which is pushed up by the wheels 3 in the usual manner. The furrows thus closed are engaged by the lower ends of the tines 7 and the soil is scattered and leveled over the planted seed in a pulverized condition, thereby retarding grass seed germination.

Inasmuch as the sprocket wheel 40 engages the upper side of the upper run of the chain 33, the said sprocket wheel 40 together with the shaft 39 rotates in the opposite direction from that in which the axle 2 rotates. Consequently the upper portions of the wheels 38 turn in a rearwardly direction. As the lugs 41 move upwardly from the castings 50 the seed with which the hoppers 36 are supplied will lodge in the uppermost recesses at the ends of the lugs 41 and are carried up under the hood section 48, thence down through the hood section 49 and are dropped into the boots 45.

Having thus described the invention, what is claimed as new is:

1. A planter comprising a wheel mounted frame portion, a second frame portion pivotally connected with the first mentioned frame portion, means mounted upon the first mentioned frame portion and engageable with the second mentioned frame portion and adapted to be operated to raise or lower the second mentioned frame portion with relation to the first mentioned frame portion, a furrow opener carried by the second mentioned frame portion, a dropper carried by the second mentioned frame portion and adapted to deposit material in the furrow opened by said furrow opener, means carried by the second mentioned frame portion and adapted to partially close said furrow, a dropper carried by the first mentioned frame portion and adapted to deposit material in the partially closed furrow, and a furrow closer carried by the first mentioned frame portion.

2. A planter comprising a wheel mounted frame portion, a second frame portion pivotally connected with the first mentioned frame portion, a shaft journaled upon the first mentioned frame portion, cams carried by said shaft and lying under and in engagement with the second mentioned frame portion, a furrow opener carried by the second mentioned frame portion, a dropper carried by the second mentioned frame portion and adapted to deposit material in the furrow opened by said furrow opener, means carried by the second mentioned frame portion and adapted to partially close said furrow, a dropper carried by the first mentioned frame portion and adapted to deposit material in the partially closed furrow, and a furrow closer carried by the first mentioned frame portion.

3. A planter comprising a wheel mounted frame portion, a second frame portion pivotally connected with the first mentioned frame portion, means carried by the first mentioned frame portion for raising or lowering the second mentioned frame portion, caster frames pivotally connected with the second mentioned frame portion, a furrow opener carried by said caster frames, a dropper carried by the second mentioned frame portion and adapted to deposit material in the furrow opened by said furrow opener, means carried by said caster frame and adapted to partially close said furrow, a dropper carried by the first mentioned frame portion and adapted to deposit material in the partially closed furrow, and a furrow closer carried by the first mentioned frame portion.

4. A planter comprising a wheel mounted frame portion, a second frame portion connected with the first mentioned frame portion, means carried by the first mentioned frame portion for raising or lowering the second mentioned frame portion, a hollow caster frame pivotally connected with the second mentioned frame portion, a furrow opener carried by said caster frame, a dropper carried by the second mentioned frame portion and adapted to deposit material into the furrow opened by the furrow opener through the hollow caster frame, a furrow closer carried by the caster frame and adapted to partially close the furrow, a dropper carried by the first mentioned frame portion and adapted to deposit material in the partially closed furrow, and a furrow closer carried by the first mentioned frame portion.

5. A planter comprising a wheel mounted frame portion, a second frame portion pivotally connected with the first mentioned frame portion, means for raising or lowering the second mentioned frame portion with relation to the first mentioned frame portion, a furrow opener carried by the second mentioned frame portion, a dropper carried by the second mentioned frame portion and adapted to deposit material into the furrow opened by the said furrow opener, means carried by the second mentioned frame portion and adapted to partially close the furrow, a dropper mounted upon the first mentioned frame portion and adapted to deposit material in the partially closed furrow, a furrow closer carried by the first mentioned frame portion, the supporting wheel of the first mentioned frame portion being in the path of movement of the said furrow openers and closers, a sleeve journaled upon the first mentioned frame portion behind the wheel, tines depending from the sleeve and adapted to travel behind the wheel, and a scraper carried by the sleeve and adapted to engage the wheel when the tines are in engagement with the soil.

6. A planter comprising a wheel mounted frame portion, a tongue connected thereto, means for swinging the tongue vertically with relation to the said frame portion, a second frame portion pivotally connected with the first mentioned frame portion, means carried by the first mentioned frame portion for swinging the second mentioned frame portion vertically, a furrow opener carried by the second mentioned frame portion, a fertilizer dropper carried by the second mentioned frame portion and adapted to deposit fertilizer in the furrow opened by the said furrow opener, seed dropping mechanism carried by the first mentioned frame portion and adapted to deposit seed in the furrow opened by the furrow opener, and furrow closing means carried by the first mentioned frame portion.

7. A planter comprising a wheel mounted frame portion, a second frame portion pivotally connected with the first mentioned frame portion, caster frames pivoted to the second mentioned frame portion, furrow opening disks journaled upon the caster frames, fertilizer dropping mechanism carried by the second mentioned frame portion and adapted to deposit fertilizer in the furrow opened by the furrow opener, disks journaled to the caster frame and adapted to cover the fertilizer deposited in the furrow, a disk carried by the first mentioned frame portion and adapted to make an incision in the furrow opened by the furrow opener, seed dropping mechanism carried by the first mentioned frame portion and adapted to deposit seed in the incision made by the last mentioned disk, and furrow closing means carried by the first mentioned frame portion.

In testimony whereof I affix my signature in presence of two witnesses.

WILLIAM L. HARRIS. [L. S.]

Witnesses:
 HIRAM BELL,
 H. B. PUGH.

Copies of this patent may be obtained for five cents each, by addressing the "Commissioner of Patents, Washington, D. C."